United States Patent
Puaatuua

[11] Patent Number: 5,419,605
[45] Date of Patent: May 30, 1995

[54] DECORATIVE INSERT FOR A SLIDING REAR WINDOW UNIT IN A PICKUP TRUCK

[76] Inventor: Tupua M. Puaatuua, 905 Sparrow Ct., Henderson, Nev. 89014

[21] Appl. No.: 210,427

[22] Filed: Mar. 21, 1994

[51] Int. Cl.6 .............................. E06B 3/32
[52] U.S. Cl. .................. 296/146.1; 160/105; 49/57
[58] Field of Search ............... 296/146.1, 152; 160/105, DIG. 2, 215, 217; 49/50, 57, 463, 465

[56] References Cited

U.S. PATENT DOCUMENTS

| | | | |
|---|---|---|---|
| 1,946,381 | 2/1934 | Bank | 160/105 |
| 2,742,961 | 4/1956 | Van Camp et al. | 160/105 |
| 2,803,471 | 8/1957 | Roth | 160/105 X |
| 3,016,952 | 1/1962 | Shero | 160/105 |
| 3,032,351 | 5/1962 | Lewis, Jr. | 49/57 X |
| 4,059,923 | 11/1977 | Saver | 49/57 |
| 4,587,759 | 5/1986 | Gray | 49/50 |
| 4,593,492 | 6/1986 | Lumenello | 49/50 X |
| 4,653,226 | 3/1987 | Woodrow | 49/50 X |
| 4,653,562 | 3/1987 | Moss et al. | 296/146.1 X |
| 4,854,364 | 8/1989 | Junker | 296/152 X |
| 4,913,212 | 4/1990 | Clavier | 160/105 |
| 4,936,368 | 6/1990 | Philbeck et al. | 160/105 X |
| 5,192,112 | 3/1993 | Gherardi et al. | 296/146.1 X |
| 5,311,701 | 5/1994 | Psaros | 160/105 X |

FOREIGN PATENT DOCUMENTS 209614  12/1983  Japan .................. 296/152

*Primary Examiner*—Joseph Pape
*Attorney, Agent, or Firm*—Michael I. Kroll

[57] ABSTRACT

A decorative insert is provided for a sliding rear window unit in a pickup truck. The unit has a window frame with upper and lower tracks, installed in a back wall of a cab on the pickup truck. The insert consists of a bottom horizontal rail member, a top horizontal rail member and a plurality of bars. Fasteners are for mounting the bars in spaced apart vertical positions between the bottom horizontal rail member and the top horizontal rail member. A component on the bottom horizontal rail member is for engaging with the lower track in the window frame of the sliding rear window unit. An element on the top horizontal rail member is for engaging with the upper track in the window frame of the sliding rear window unit.

7 Claims, 2 Drawing Sheets

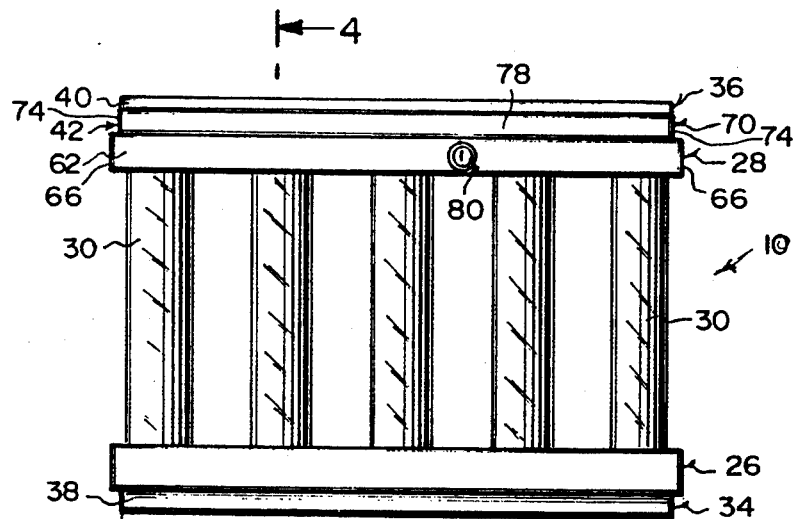
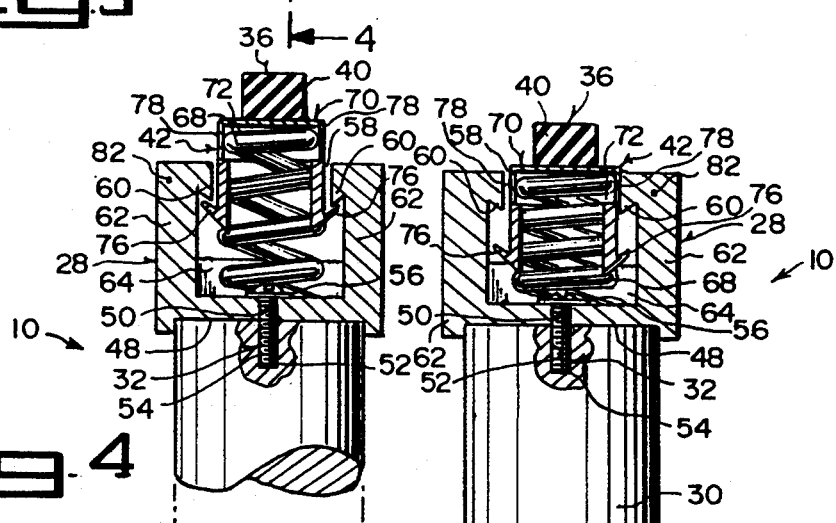
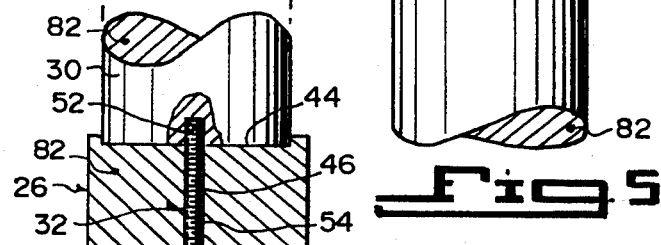
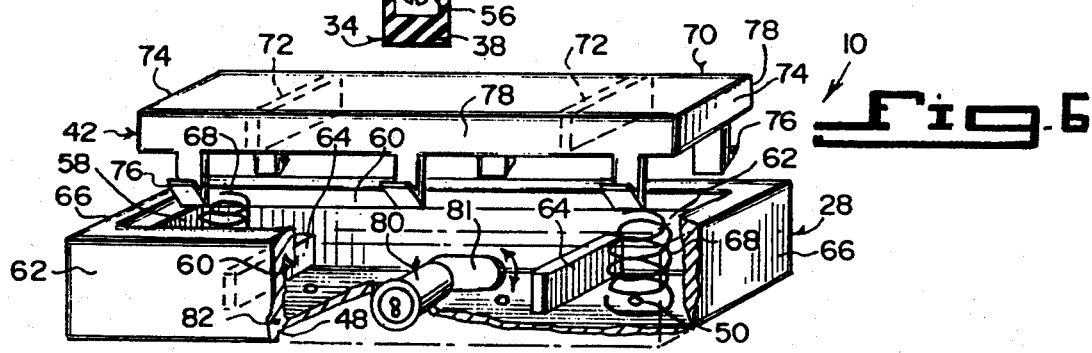

DECORATIVE INSERT FOR A SLIDING REAR WINDOW UNIT IN A PICKUP TRUCK

BACKGROUND 9F THE INVENTION

1. Field of the Invention

The instant invention relates generally to automotive accessories and more specifically it relates to a decorative insert for a sliding rear window unit in a pickup truck.

2. Description of the Prior Art

Numerous automotive accessories have been provided in prior art that are adapted to be utilized in replacing and repairing various components in motor vehicles. While these units may be suitable for the particular purpose to which they address, they would not be as suitable for the purposes of the present invention as heretofore described.

SUMMARY OF THE INVENTION

A primary object of the present invention is to provide a decorative insert for a sliding rear window unit in a pickup truck that will overcome the shortcomings of the prior art devices.

Another object is to provide a decorative insert for a sliding rear window unit in a pickup truck that is a purely cosmetic product intended for use by a truck owner who frequently buys after-market products to enhance the beauty and appearance of their personal vehicle.

An additional object is to provide a decorative insert for a sliding rear window unit in a pickup truck that will allow rear visibility out of and ventilation into the cab of the pickup truck.

A further object is to provide a decorative insert for a sliding rear window unit in a pickup truck that is simple and easy to use.

A still further object is to provide a decorative insert for a sliding rear window unit in a pickup truck that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a front view of the instant invention per se.

FIG. 4 is an enlarged cross sectional view with parts broken away taken along line 4—4 in FIG. 3.

FIG. 5 is an enlarged cross sectional view of the upper portion similar to FIG. 4 with the lid depressed into the top horizontal rail member.

FIG. 6 is an exploded perspective view with parts broken away showing the lid ready to be inserted into the top horizontal rail member.

DETAILED DESCRIPTION OF THE PREFERRED EMBODIMENTS

Figure 1:
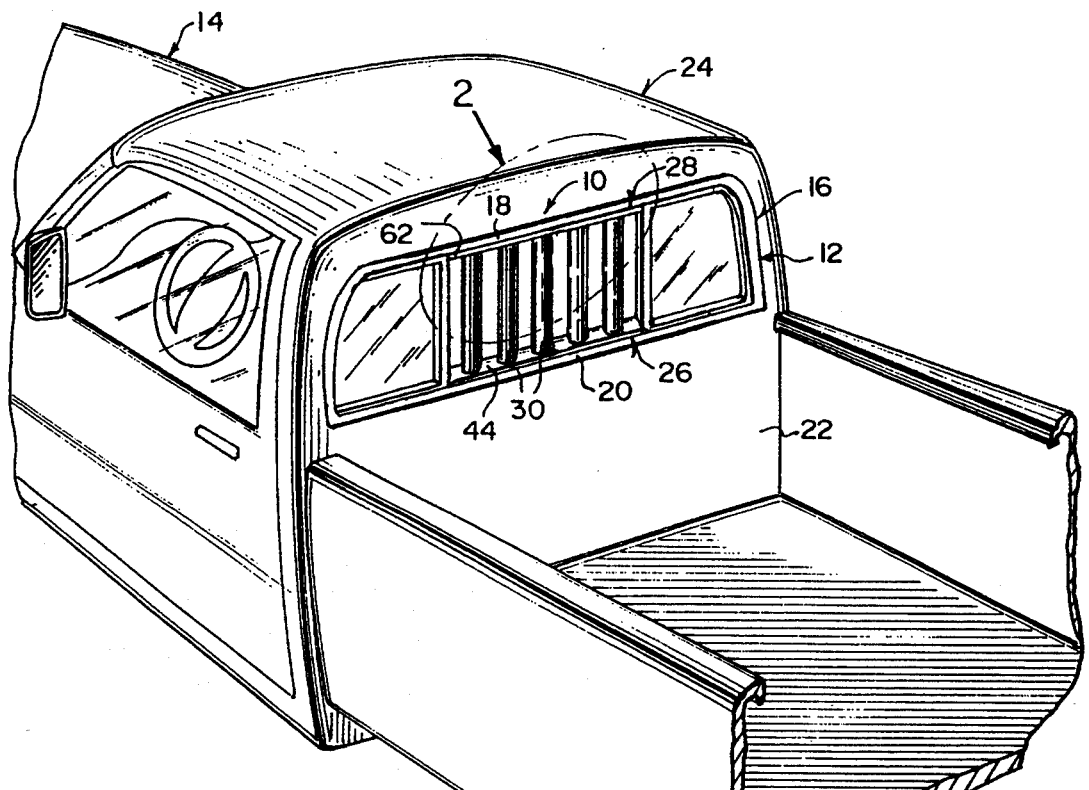
FIG. 1 is a rear perspective view of a portion of a pickup truck showing the instant invention installed in a window frame of a sliding rear window unit in a back wall of a cab.
Figure 2:
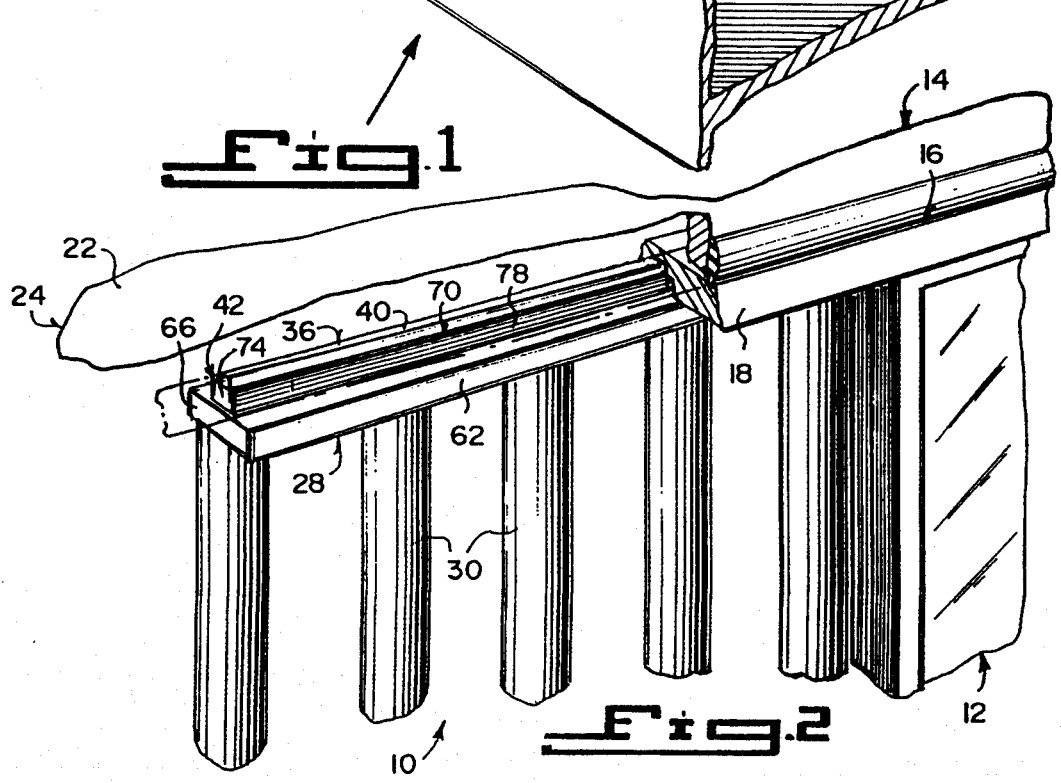
FIG. 2 is an enlarged rear perspective view as indicated by arrow 2 in FIG. 1.

Turning now descriptively to the drawings, in which similar reference characters denote similar elements throughout the several views, FIGS. 1 through 6 illustrate a decorative insert 10 for a sliding rear window unit 12 in a pickup truck 14. The unit 12 has a window frame 16 with upper and lower tracks 18, 20 installed in a back wall 22 of a cab 24 on the pickup truck 14.

The insert 10 consists of a bottom horizontal rail member 26, a top horizontal rail member 28 and a plurality of bars 30. Fasteners 32 are for mounting the bars 30 in spaced apart vertical positions between the bottom horizontal rail member 26 and the top horizontal rail member 28. A component 34 on the bottom horizontal rail member 26 is for engaging with the lower track 20 in the window frame 16 of the sliding rear window unit 12. An element 36 on the top horizontal rail member 28 is for engaging with the upper track 18 in the window frame 16 of the sliding rear window unit 12.

The lower track engaging component 34 is a bottom rubber gasket 38 mounted under the bottom horizontal rail member 26, which fits into the lower track 20 of the window frame 16. The upper track engaging element 36 is a top rubber gasket 40 mounted onto the top horizontal rail member 28, which fits into the upper track 18 of the window frame 12.

A structure 42 in the top horizontal rail member 28, is for biasing the top rubber gasket 40 into the upper track 18 of the window frame 16. The decorative insert 10 will be held securely between the upper track 18 and the lower track 20 of the window frame 16.

The mounting fasteners 32 for the bars 30 consists of the bottom horizontal rail member 26, having a top seat 44 formed therein with a plurality of spaced apart threaded holes 46 therethrough. The top horizontal rail member 28 has a bottom seat 48 formed therein, with a plurality of spaced apart threaded holes 50 therethrough, that line up with the spaced apart threaded holes 46 in the bottom horizontal rail member 26.

Each bar 30 has a threaded aperture 52 into each opposite end. Each bar 30 can be vertically positioned between the top seat 44 in the bottom horizontal rail member 26 and the bottom seat 48 in the top horizontal rail member 28, with the threaded apertures 52 in alignment with the threaded holes 46, 50. A plurality of screws 54 and a plurality of lock washers 56 are also provided. One screw 54 with one lock washer 56 can thread through each hole 46 in the bottom horizontal rail member 26 and into each threaded aperture 52 in each bar 30. One screw 54 with one lock washer 56 can also thread through each hole 50 in the top horizontal rail member 28 and into each opposite threaded aperture 52 in each bar 30.

The biasing structure 42 includes the top horizontal rail member 28 having a top open channel 58. A pair of notches 60 are each formed within the channel 58 on an opposite long wall 62. A first pair of transverse barriers 64 are within the channel 58, with each near an end wall 66 thereof. A pair of springs 68 are provided, with each positioned within the channel 58 between one barrier 64 and one end wall 66.

An elongated lid 70 is sized to fit into the channel 58 over the springs 68. A second pair of transverse barriers 72 are within the lid 70, with each near an end wall 74 thereof. A plurality of spaced apart clips 76 extend downwardly along each long wall 78 of the lid 70.

When the lid 70 is placed into the channel 58, as shown in FIG. 4, the clips 76 will engage with the notches 60. When the lid 70 is depressed into the channel, as shown in FIG. 5, the clips 76 will disengage from the notches 60.

A lock 80 in one long wall 62 of the top horizontal rail member 28 extends into the channel 58. The lock 80 has an inner tab 81, so that when the lock 80 is operated by a key (not shown), the inner tab 81 will be positioned to not allow the lid 70 to be depressed into the channel 58, thereby preventing the decorative insert 10 from being removed from the window frame 16.

The bottom horizontal rail 26, the top horizontal rail 28 and each bar 30 is fabricated out of chrome plated steel 82.

| LIST OF REFERENCE NUMBERS | |
|---|---|
| 10 | decorative insert |
| 12 | sliding rear window unit |
| 14 | pickup truck |
| 16 | window frame |
| 18 | upper track in 16 |
| 20 | lower track in 16 |
| 22 | back wall of 24 |
| 24 | cab on 14 |
| 26 | bottom horizontal rail member |
| 28 | top horizontal rail member |
| 30 | bar |
| 32 | mounting fastener |
| 34 | lower track engaging component |
| 36 | upper track engaging element |
| 38 | bottom rubber gasket for 34 |
| 40 | top rubber gasket for 36 |
| 42 | biasing structure |
| 44 | top seat in 26 |
| 46 | threaded hole in 26 |
| 48 | bottom seat in 28 |
| 50 | threaded hole in 28 |
| 52 | threaded aperture in 30 |
| 54 | screw |
| 56 | lock washer |
| 58 | top open channel in 28 |
| 60 | notch on 62 |
| 62 | long wall of 28 |
| 64 | first transverse barrier in 58 |
| 66 | end wall of 28 |
| 68 | spring |
| 70 | elongated lid |
| 72 | second transverse barrier in 70 |
| 74 | end wall of 70 |
| 76 | clip on 78 |
| 78 | long wall of 70 |
| 80 | lock in 62 |
| 81 | inner tab on 80 |
| 82 | chrome plated steel |

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A decorative insert for a sliding rear window unit in a pickup truck, the unit having a window frame with upper and lower tracks, installed in a back wall of a cab on the pickup truck, said insert comprising:
   a) a bottom horizontal rail member;
   b) a top horizontal rail member;
   c) a plurality of bars;
   d) means for mounting said bars in spaced apart vertical positions between said bottom horizontal rail member and said top horizontal rail member;
   e) means on said bottom horizontal rail member, for engaging with the lower track in the window frame of the sliding rear window unit, said lower track engaging means being a bottom rubber gasket mounted under said bottom horizontal rail member which fits into the lower track of the window frame;
   f) means on said top horizontal rail member for engaging with the upper track in the window frame of the sliding rear window unit, said upper track engaging means being a top rubber gasket mounted onto said top horizontal rail member, which fits into the upper track of the window frame; and
   g) means in said top horizontal rail member for biasing said top rubber gasket into the upper track of the window frame, so that said decorative insert will be held securely between the upper track and the lower track of the window frame.

2. A decorative insert as recited in claim 1, wherein said mounting means for said bars includes:
   a) said bottom horizontal rail member having a top seat formed therein with a plurality of spaced apart threaded holes therethrough;
   b) said top horizontal rail member having a bottom seat formed therein with a plurality of spaced apart threaded holes therethrough, that line up with said spaced apart threaded holes in said bottom horizontal rail member;
   c) each said bar having a threaded aperture into each opposite end, so that each said bar can be vertically positioned between said top seat in said bottom horizontal rail member and said bottom seat in said top horizontal rail member with said threaded apertures in alignment with said threaded holes;
   d) a plurality of screws; and
   e) a plurality of lock washers, whereby one said screw with one said lock washer can thread through each said hole in said bottom horizontal rail member and into each said threaded aperture in each said bar, while one said screw with one said lock washer can also thread through each said hole in said top horizontal rail member and into each said opposite threaded aperture in each said bar.

3. A decorative insert as recited in claim 2, wherein said biasing means includes:
   a) said top horizontal rail member having a top open channel;
   b) a pair of notches, each formed within said channel on an opposite long wall;
   c) a first pair of transverse barriers within said channel, each near an end wall thereof;
   d) a pair of springs, each positioned within said channel between one said barrier and one said end wall;

e) an elongated lid sized to fit into said channel over said springs;

f) a second pair of transverse barriers within said lid, each near an end wall thereof; and g) a plurality of spaced apart clips extending downwardly along each long wall of said lid, so that when said lid is placed into said channel, said clips will engage with said notches and when said lid is depressed into said channel, said clips will disengage from said notches.

4. A decorative insert as recited in claim 3, further including a lock in one said long wall of said top horizontal rail member extending into said channel, said lock having an inner tab so that when said lock is operated by a key, said inner tab will be positioned to not allow said lid to be depressed into said channel, thereby preventing said decorative insert from being removed from said window frame.

5. A decorative insert as recited in claim 4, wherein said bottom horizontal rail is fabricated out of chrome plated steel.

6. A decorative insert as recited in claim 5, wherein said top horizontal rail is fabricated out of said chrome plated steel.

7. A decorative insert as recited in claim 6, wherein each said bar is fabricated out of said chrome plated steel.

* * * * *